United States Patent [19]

Kobliska et al.

[11] Patent Number: 4,861,662

[45] Date of Patent: Aug. 29, 1989

[54] PROTECTIVE LAYER FOR MAGNETIC DISK

[75] Inventors: Robert J. Kobliska, San Jose; Eric K. Li, Palo Alto, both of Calif.

[73] Assignee: Akashic Memories Corporation, Santa Clara, Calif.

[21] Appl. No.: 10,381

[22] Filed: Feb. 3, 1987

[51] Int. Cl.$^4$ .............................................. G11B 5/64
[52] U.S. Cl. ...................................... 428/408; 427/34; 427/38; 427/131; 428/694; 428/695; 428/900
[58] Field of Search ...................... 428/694, 900, 408; 427/41, 44, 131, 34, 38; 360/135

[56] References Cited

U.S. PATENT DOCUMENTS

| 4,411,963 | 10/1983 | Aine et al. | 428/900 |
| 4,503,125 | 3/1985 | Nelson et al. | 427/131 |
| 4,596,735 | 6/1986 | Noguchi et al. | 428/694 |
| 4,643,915 | 2/1987 | Arai et al. | 427/131 |
| 4,647,494 | 3/1987 | Meyerson et al. | 428/408 |
| 4,737,415 | 4/1988 | Ichijo et al. | 427/41 |

Primary Examiner—Paul J. Thibodeau
Attorney, Agent, or Firm—Joseph H. Smith

[57] ABSTRACT

A magnetic recording disk composed of a substrate, a magnetic layer, and a protective/lubricative carbon layer is etched and has oxygen embedded into the surface of the disk. This carbon/oxygen surface is extremely smooth, and wears better than prior art disks not having oxygen imbedded in the surface. This altered layer enables a magnetic disk to undergo over twice the number of start/stop cycles without incurring damage from magnetic transducers used to read information from the recording than similar disks prepared without oxygen in the outer layer. A method of plasma etching is used to embed the oxygen into the surface.

7 Claims, 2 Drawing Sheets

PROTECTIVE LAYER FOR MAGNETIC DISK

BACKGROUND OF THE INVENTION

This invention relates to magnetic disks for use as memory storage devices, and more specifically to magnetic disks whose final protective and lubricative layer is carbon.

On a magnetic disk there may be millions of magnetized regions, each region representing one bit of information. To write to and read from the disk, a magnetic transducer, or head, is supported in close proximity to the disk surface by a cushion of air created by the swiftly rotating surface of the disk. Rotational speeds are typically 60 revolutions per second, and the flying height may be a quarter of a micrometer or even less.

When the disk spindle is powered off or powered on there is insufficient rotational speed to generate the supporting cushion of air for the head to fly above the surface, and the head, with a load typically on the order of a few grams, drags on the disk surface. This dragging can cause scratching or wearing of the disk's thin outer protective/lubricating layer (300-800 Å) and may eventually damage regions of the magnetic layer causing erroneous data to be read from the disk. This reading of erroneous data is referred to hereinafter as "disk wear".

Similarly, when the disk is started or stopped, the static friction and stiction between the head and the disk also wears the outer protective layer, eventually wearing through portions of the protective layer and damaging the underlying magnetic layer. In addition, with respect to dynamic friction, once wearing of the outer layer begins, wearing is accelerated due to increased friction created by the increased roughness of the surface. Wear particles also intersperse themselves between the disk and head rail surfaces, further increasing friction and decreasing disk lifetime.

A standard of 10,000 stop/start cycles before disk wear is a standard established by the American National Standards Institute (ANSI) for acceptable disk performance and is the generally accepted minimum standard in the industry. In practice, moreover, this standard must be surpassed by comfortable margins for disks to be acceptable by users. Since for thin film disks obtaining high density recording of 15000 bpi and above entails flying the head as close to the magnetic layer as possible, the protective overcoat on top of the magnetic layer must be thinner than 800 Å and is typically around 300 Å. This extreme thinness of the outer protective layer means that the protective layer is particularly vulnerable to wear. Hence, any technique that significantly increases the number of start/stop cycles before disk wear occurs would be valuable to the manufacturers of thin film disks.

SUMMARY OF THE INVENTION

In accordance with preferred embodiments of the invention, a magnetic disk is provided having an altered carbon surface protective layer which has an increased lifetime, measured in terms of start/stop cycles. Testing of these improved disks has shown an increased disk life of 100 percent over the prior art disks.

Given a prior art magnetic recording disk with a protective outer carbon layer, the present invention uses an oxygen plasma etching procedure to remove loosely bound carbon atoms and to embed oxygen ions into the carbon layer in order to obtain a composition of carbon and oxygen on the disk surface. This treatment removes weakly structured carbon from the disk's surface and alters the surface composition. The result is that the disk wears less than prior art disks not using the present method, thus enabling disk life to be significantly prolonged.

To create the desired composition on the surface of a disk with an existing outer carbon layer, the disk is placed in the chamber of a plasma etching or sputtering device with the disk's carbon layer immersed in the plasma at floating potential. Oxygen ($O_2$) is injected into the chamber, the chamber typically having an inside pressure of about 600 mTorr. The carbon surface is then plasma etched with oxygen ions until the disk surface has an atomic percentage of between 15-40% oxygen and 85-60% carbon, as measured by Electron Spectroscopy for Chemical Analysis (ESCA) with the top 100 Å of the disk outer surface. At the same time, the total thickness of the carbon is slightly reduced from its thickness prior to the plasma treatment.

DETAILED DESCRIPTION OF THE INVENTION

Figure 1:
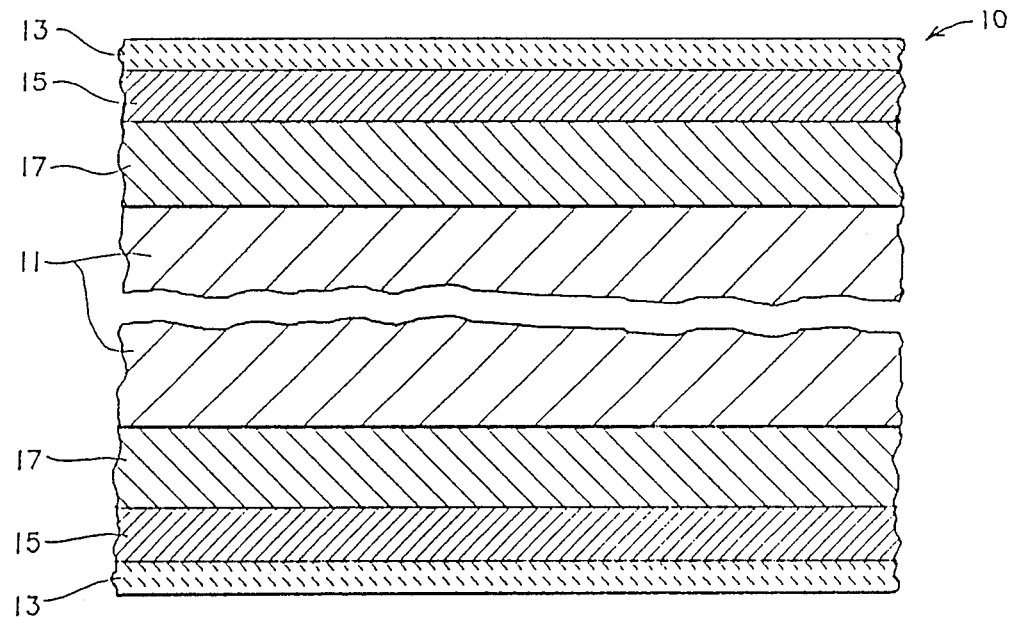
FIG. 1 shows the construction of a typical prior art magnetic disk.

FIG. 1 shows the various layers of a prior art sputtered thin-film magnetic memory hard disk. Such hard disks are typically constructed by using several thin-film layer depositions on an aluminum or aluminum alloy substrate 11. Typically a chromium layer 17 is sputtered onto the substrate to ensure proper growth morphology and crystal structure of the ensuing sputtered magnetic layer. A general description of plasma processing is given in U.S. Pat. No. 4,597,847, entitled "Non-Magnetic Sputtering Target", by Boys, issued on July 1, 1986, and in "Solid State Technology", August 1982, pages 79-103.

A magnetic layer 15, typically having a composition of nickel and cobalt, or cobalt-nickel-chromium, is then sputtered onto the chromium surface. A final protective and/or lubricative layer 13, such as rhodium, $Al_2O_3$, $SiO_2$, or carbon, is then sputtered onto the magnetic layer.

In accordance with the preferred embodiment of the invention, oxygen ions are embedded into the surface of a prior art disk which uses carbon as its final protective layer. This is accomplished by plasma etching the disk's carbon surface using oxygen, or a gas containing oxygen, such as air, as the etching gas until there is an atomic ratio of approximately 15-40% oxygen and 85-60% carbon as measured by ESCA within the top 100 Å of the disk surface, i.e. if the atomic percentage of oxygen is X, the atomic percentage of carbon is 100−X, assuming $O_2$ as the plasma gas, and X varies between 15-40. Further, it is more preferred if X is between 15 and 30, and it appears that the optimal surface and lifetime characteristics occur at a most preferred value for X of about 21.

A concomitant and highly desirable result of plasma etching the carbon surface is that weakly bound carbon atoms on the disk surface are removed by the ions in the plasma, leaving a relatively smooth surface of strongly bound carbon atoms. However, it appears that it is not necessary to use an oxygen plasma for this "polishing" function. Nevertheless, using an oxygen plasma for both embedding oxygen into the surface and polishing the disk surface appears to be the most practical method. Other etchant gases, for example a mixture of $CF_4$ and $O_2$, or argon, may produce similar polishing results. The resulting smooth surface helps minimize disk wear by reducing head-on-disk friction.

Figure 2:
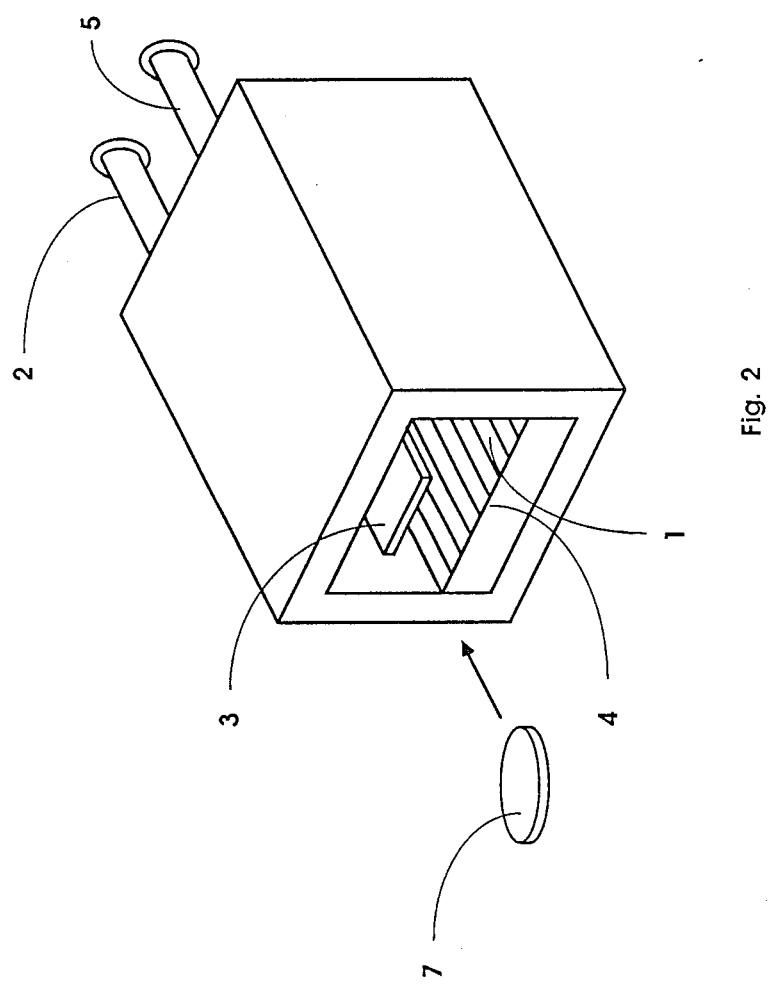
FIG. 2 shows a general schematic of the Tegal 915 Plasma Production Etcher/Stripper used for the plasma etching process.

Shown in FIG. 2 is an apparatus useful in carrying out the method of the invention, which is made up of a chamber 1 such as that used in a Tegal 915 Plasma Production Etcher/Stripper having an upper electrode 3, a lower electrode 4, a gas inlet port 2 and an exhaust port 5. A disk 7 having an outer carbon layer is loaded into the chamber and the chamber is closed. $O_2$, the preferred gas, is injected into the chamber via gas inlet port 2 while the chamber is pumped down to a pressure of 600 mTorr. Approximately 75 watts of RF power at a frequency of 13.56 MHz is applied to electrode 3 for about 15 seconds. The disk is not connected to any electrode so that its potential is left floating. The function of the RF energy is to excite electrons in the $O_2$ sufficiently to escape from the $O_2$ molecules, thus forming oxygen bearing ions. The oxygen ions then react with the disk and embed in the protective carbon surface. Using the above process the resulting outer layer of the disk will be very smooth due to the oxygen etching of some of the carbon from the surface, and it will be composed of an atomic ratio of approximately 20% oxygen and 80% carbon as measured by ESCA within the top 100 Å of the disk surface. Other relative percentages of oxygen and carbon can be achieved by varying the time of the oxygen etch.

Extensive testing of disks which have been prepared by the method described in the preferred embodiment shows that the carbon/oxygen layer greatly increases disk lifetime as measured by its number of start/stop cycles experienced before disk wear. For example, 20,000 start/stop cycles were consistently achieved before encountering erroneous data during testing with disks which underwent this process, while often less than 5000 start/stop cycles was customary lifetime for the same type of disks that were not treated by the process of the invention.

Although the above method of embedding oxygen in a carbon surface using only $O_2$ is the preferred embodiment of this invention, other methods and gases may be used to achieve this structure and will be apparent to those skilled in the art. For example, ion implantation can also be used instead of plasma etching. The claims for the present invention are intended to cover all such methods and apparatus deviations that fall within the true spirit and scope of the invention.

What is claimed is:

1. A method of increasing the lifetime of a magnetic disk recording device of the type having an outer carbon layer of elemental carbon over a magnetic recording layer, comprising the step of:
    imbedding oxygen in the outer carbon layer until the atomic ratio in the outer 100 Angstroms of the carbon layer is in the range between 15% oxygen:85% carbon and 40% oxygen:60% carbon.

2. The method of claim 1 wherein the step of imbedding oxygen comprises:
    loading the disk into an evacuated chamber; and
    introducing a gas containing oxygen into the chamber; and
    applying RF power inside the chamber to create a plasma and continuing the RF power until the atomic composition within the top 100 Å of the carbon layer is between 15–40% oxygen and 85–60% carbon as measured by ESCA.

3. The method of claim 1 wherein the step of embedding oxygen into the carbon layer is continued until the carbon layer has an atomic composition of between 15–30% oxygen and 85–70% carbon, as measured by ESCA, in the top 100 Å of the carbon layer.

4. A method as in claim 1 wherein the step of imbedding oxygen comprises:
    loading the disk into an evacuated chamber;
    introducing a gas continuing oxygen into the chamber; and
    applying RF power inside the chamber to create a plasma and continuing the RF power until the atomic composition within the top 100 Å of the carbon layer is between 15–30% oxygen and 85–60% carbon as measured by ESCA.

5. A method of increasing the lifetime of a magnetic disk recording device of the type having an outer carbon layer over a magnetic recording layer, comprising the step of:
    etching the carbon layer using oxygen as an etchant gas to remove loosely bound carbon atoms, and continuing the etching until the atomic ratio in the outer 100 Angstroms of the carbon layer is in the range between 15% oxygen:85% carbon and 40% oxygen:60% carbon.

6. A magnetic recording disk comprising:
    a substrate;
    a magnetic layer over said substrate;
    a carbon layer over said magnetic layer having an outer surface;
    said carbon layer having an atomic composition of X% oxygen and 100−X% carbon within 100 Å of the outer surface as measured by ESCA, where X is in the range of 15 to 40.

7. A magnetic disk as in claim 6 wherein X is in the range of 15 to 30.

* * * * *